United States Patent
Maki et al.

(10) Patent No.: US 8,042,885 B2
(45) Date of Patent: Oct. 25, 2011

(54) BRAKE CONTROL APPARATUS FOR VEHICLE

(75) Inventors: Kazuya Maki, Nagoya (JP); Hiroaki Niino, Toyota (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 1305 days.

(21) Appl. No.: 11/698,914

(22) Filed: Jan. 29, 2007

(65) Prior Publication Data

US 2007/0188019 A1  Aug. 16, 2007

(30) Foreign Application Priority Data

Feb. 15, 2006 (JP) ................................ 2006-037997

(51) Int. Cl.
*B60T 8/88* (2006.01)
(52) U.S. Cl. ...................... 303/122.04; 303/122; 303/20
(58) Field of Classification Search .................... 303/10, 303/11, 122, 122.04, 122.05, 122.12, 191, 303/20
See application file for complete search history.

(56) References Cited

U.S. PATENT DOCUMENTS

| 5,487,593 | A | * | 1/1996 | Potts et al. | 303/11 |
| 5,558,414 | A | * | 9/1996 | Kubota | 303/122.08 |
| 5,957,549 | A | * | 9/1999 | Nagai et al. | 303/122.12 |
| 6,113,197 | A | | 9/2000 | Kuroki et al. | |
| 6,203,116 | B1 | * | 3/2001 | Dieckmann | 303/20 |
| 6,234,588 | B1 | | 5/2001 | Sawada | |
| 2004/0164610 | A1 | * | 8/2004 | Huther | 303/113.4 |
| 2007/0024112 | A1 | * | 2/2007 | Lindqvist et al. | 303/122.04 |

FOREIGN PATENT DOCUMENTS

| JP | 10-203338 A | 8/1998 |
| JP | 11-301435 A | 11/1999 |

* cited by examiner

*Primary Examiner* — Robert Siconolfi
*Assistant Examiner* — Vu Q Nguyen
(74) *Attorney, Agent, or Firm* — Buchanan Ingersoll & Rooney PC

(57) ABSTRACT

A brake control apparatus for a vehicle includes a controlling device for actuating the pressure modulating device and the motor, calculating a target braking force corresponding to an operation amount, and driving the motor and the pressure modulating device, wherein, in an electric power supply stopped situation, in which electric power is not supplied by the battery, while an operation amount detected by the operation amount sensor increases, the controlling device starts driving the motor by means of electric power supplied by the capacitor, only when a target braking force corresponding to the operation amount reaches memorized target braking force memorized in the memorizing portion.

7 Claims, 5 Drawing Sheets

BRAKE CONTROL APPARATUS FOR VEHICLE

CROSS REFERENCE TO RELATED APPLICATIONS

This application is based on and claims priority under 35 U.S.C. §119 to Japanese Patent Application 2006-037997, filed on Feb. 15, 2006, the entire content of which is incorporated herein by reference.

FIELD OF THE INVENTION

The present invention relates to a brake control apparatus for a vehicle in which a pump is employed to generate pressure (hereinafter referred to as W/C pressure) at a wheel cylinder (hereinafter, W/C).

BACKGROUND

Heretofore, JP10-203338A (corresponding to US006113197A) proposes a vehicle brake control apparatus of a brake-by-wire type, which has four pumps respectively for four wheels of a vehicle. Two of the four pumps are located in a first conduit system and driven by a common motor, and the other two of the four pumps are located in a second conduit system and are driven by another common motor.

In the above-described brake-by-wire type brake control apparatus for a vehicle, each motor for actuating a control valve and the pump, which are provided at each conduit system, is basically driven by electric power supplied by a battery.

Due to some abnormality (e.g., a battery runs out of electric power), when the battery stops supplying electric power (hereinafter referred to as an electric power supply stopped situation), electric power charged in a capacitor, which is prepared as a backup battery, is used to drive each motor for actuating the control valve and the pump provided at each conduit system.

In this configuration, even when the electric power supplied by the battery is stopped (in the electric power supply stopped situation), a level of a pressure applied to each wheel cylinder (hereinbelow referred to as a W/C) by actuating the motor can be gradually changed so as to correspond to a level of a pressure set on the basis of a brake pedal operation by a driver.

However, in the electric power supply stopped situation, when the motor is driven in the same manner when the electric power is supplied by the battery (in a normal brake operation), because a large amount of electric power is consumed, a large size of the capacitor needs to be provided in order to store a large amount of electric power, otherwise an amount of electric power to be consumed in the electric power supply stopped situation needs to be reduced.

A need thus exists to provide a brake control apparatus for a vehicle having a capacitor that can apply a pressure to each W/C in an electric power supply stopped situation, wherein an amount of electric power to be consumed in an electric power supply stopped situation is set to be smaller than an amount of electric power to be consumed in a normal brake operation, in which the battery supplies electric power to the motor and the like.

SUMMARY OF THE INVENTION

According to an aspect of the present invention, controlling means drives the pressure modulating means and motor means based upon a detection signal of the operation amount sensor, calculates a target braking force corresponding to an operation amount of the operation detected by the operation amount sensor, when an operation of the brake operating member is detected based upon the detection signal of the operation amount sensor, drives the motor means and the pressure modulating means by means of electric power supplied by one of the battery and the capacitor, so that a braking force corresponding to the target braking force is generated, and has a memorizing portion memorizing a memorized target braking force at which driving the motor is started, wherein, in an electric power supply stopped situation, in which electric power is not supplied by the battery or the amount of electric power supplied by the battery is insufficient, while an operation amount detected by the operation amount sensor increases, the controlling means starts driving the motor means by means of electric power supplied by the capacitor, only when a target braking force corresponding to the operation amount reaches the memorized target braking force memorized in the memorizing portion.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
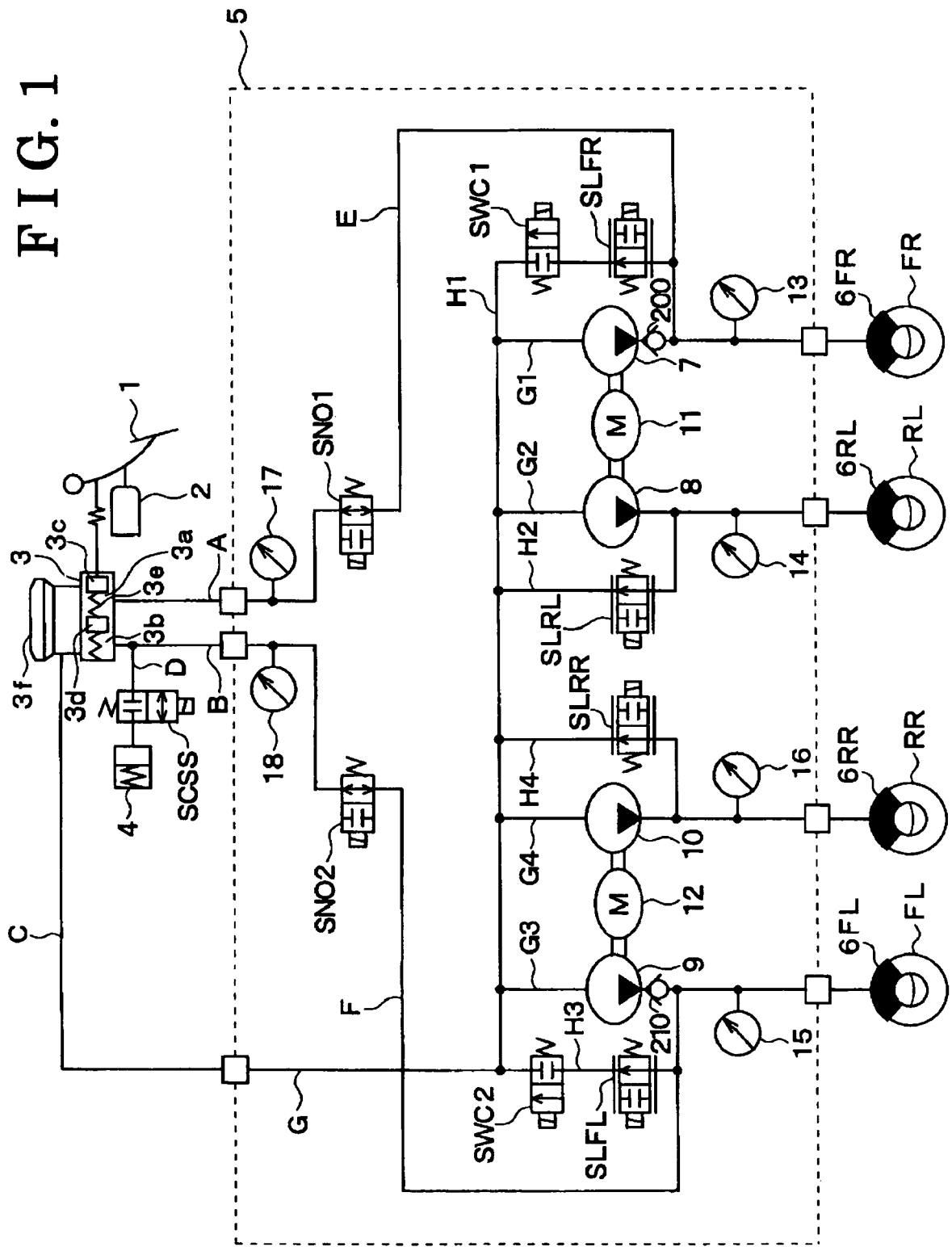
FIG. 1 illustrates a view indicating a configuration of a fluid pressure circuit of a brake control apparatus for a vehicle according to a first embodiment of the present invention.

Embodiments of the present invention will be explained below with reference to the drawings. In the embodiments below, identical reference symbols are used in the drawings to represent identical or equivalent elements.

First Embodiment

Figure 2:
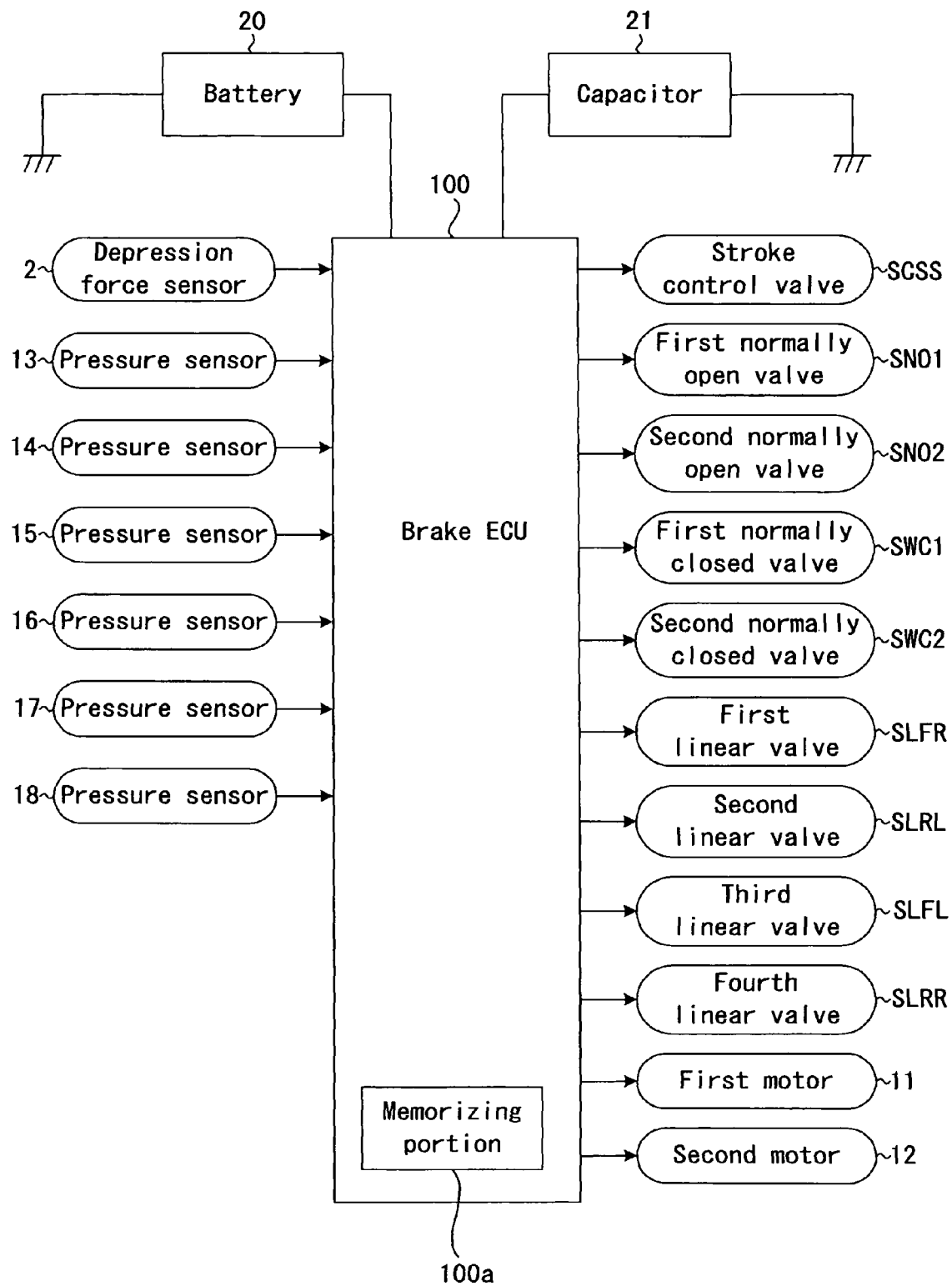
FIG. 2 illustrates a block view indicating a relationship of input and output of a signal of a brake ECU serving as a control system of the brake control apparatus illustrated in FIG. 1.

FIG. 1 illustrates a configuration of a fluid pressure circuit of a brake control apparatus for a vehicle according to a first embodiment of the present invention. FIG. 2 illustrates input and output relationships of signals of a brake system ECU 100 (controlling means) serving as a control system of the brake control apparatus for the vehicle illustrated in FIG. 1. Explained hereinafter is a structure of the brake control apparatus for a vehicle with reference to the drawings. Here, the brake control apparatus for the vehicle is applied to a vehicle having a fluid pressure circuit with a cross (X) dual conduit system (diagonal conduit system), one conduit system for front-right and rear-left wheels and the other conduit system for front-left and rear-light wheels.

As illustrated in FIG. 1, the brake control apparatus for the vehicle includes, in addition to the brake system ECU 100 (FIG. 2), a brake pedal 1 (a brake operating member), a depression force sensor 2 (an operation amount sensor) for the brake pedal 1, a brake master cylinder (hereinafter referred to as M/C) 3, a stroke control valve SCSS, a stroke simulator 4, a brake fluid pressure control actuator 5 and four wheel cylinders for each vehicle wheel (hereinafter referred to as W/C) 6FL, 6FR, 6RL and 6RR. The W/C 6FL serves as a first front wheel cylinder, the W/C 6FR serves as a second front wheel cylinder, the W/C 6RL serves as a first rear wheel cylinder, the W/C 6RR serves as a second rear wheel cylinder.

Once the brake pedal 1, which is an example of a brake operating member, is depressed by a driver or user, the depression force applied to the brake pedal 1, is inputted into the depression force sensor 2. The depression force sensor 2 outputs a detection signal corresponding to the level of depression force applied to the brake pedal 1. This detection signal is inputted into the brake system ECU 100 and the brake system ECU 100 stores the depression force applied to the brake pedal 1. According to the first embodiment, the depression force sensor 2 is employed as an example of an operation amount sensor for detecting an operation amount of the brake operating member. However, a stroke sensor or the like can be employed as long as the operation amount of the brake pedal 1 can be detected. Further, as an alternative method for detecting the operation amount of the brake operating member, a state of operation of the brake pedal 1 can be detected on the basis of a detection signal of a stroke sensor or detection signals of pressure sensors 17 and 18 for detecting the pressure at the MC (which will be described later in detail).

The brake pedal 1 is connected to a push rod, or the like for transmitting the depression force applied to the brake pedal 1 to the M/C 3. In response to a movement of the push rod, M/C pressure is generated in a primary chamber 3a and a secondary chamber 3b, both of which are defined in the M/C 3.

In the M/C 3, a primary piston 3c and a secondary piston 3d are disposed to define the primary chamber 3a and the secondary chamber 3b. The primary piston 3c and the secondary piston 3d normally receive an elastic force of a spring 3e to keep or return the brake pedal 1 to its initial non-braking position when the brake pedal 1 is not depressed, i.e., when the brake pedal 1 is free from depression force.

The primary chamber 3a of the M/C 3 is connected to a conduit A, while the secondary chamber 3b thereof is connected to a conduit B. The conduits A and B extend to a brake fluid pressure control actuator 5, respectively.

The M/C 3 is provided with a master reservoir (reservoir) 3f. When the brake pedal 1 is in the initial position, the master reservoir 3f communicates with the primary chamber 3a and the secondary chamber 3b via passages (not-illustrated), wherein the master reservoir 3f supplies brake fluid into the M/C 3 or stores surplus brake fluid of the M/C 3.

A conduit C directly extends from the master reservoir 3f to the brake fluid pressure control actuator 5.

The stroke simulator 4 is connected to a conduit D communicating with the conduit B and the stroke simulator 4 reserves therein brake fluid of the secondary chamber 3b, serving as a reservoir for the secondary chamber 3b. The conduit D is provided with the stroke control valve SCSS that is a normally closed type valve and can be controlled in two-positions, namely, an open position and a closed position, so that fluid communication in the conduit D is selectively established or interrupted. Therefore, this stroke control valve SCSS controls the brake fluid flow to the stroke simulator 4.

Described below is a structure of the brake fluid pressure control actuator 5.

A conduit E is connected to the conduit A so that the primary chamber 3a of the M/C 3 communicates with a W/C (first front W/C) 6FR for the front wheel FR (first front wheel). The conduit E is mounted with a first normally open valve SNO1 controlled in two-positions. The first normally open valve SNO1 is controlled in an open position when not electrically energized so that fluid communication in the conduit E is established. On the other hand, the first normally open valve SNO1 is controlled in a closed position when electrically energized so that the fluid communication in the conduit E is interrupted.

A conduit F is connected to the conduit B so that the secondary chamber 3b of the M/C 3 communicates with another W/C (second front W/C) 6FL for the front wheel FL (second front wheel). The conduit F is mounted with a second normally open valve SNO2 controlled in two-positions. The second normally open valve SNO2 is controlled in an open position when not electrically energized so that fluid communication in the conduit F is established. On the other hand, the second normally open valve SNO2 is controlled in a closed position when electrically energized so that the fluid communication in the conduit F is interrupted.

A conduit G is connected to the conduit C extending from the master reservoir 3f. The conduit G branches to four conduits G1 (first conduit), G2 (second conduit), G3 (third conduit) and G4 (fourth conduit). Each conduit G1, G2, G3 or G4 is connected to each W/C (first front wheel W/C) 6FR, W/C (first rear wheel W/C) 6RL, W/C (second front wheel W/C) 6FL or W/C (second rear wheel W/C) 6RR. The W/C 6RL is mounted on a rear wheel RL (first rear wheel) while the W/C 6RR is mounted on a rear wheel RR (second rear wheel).

The conduits G1, G2, G3 and G4 are provided with four pumps (first, second, third and fourth pumps) 7, 8, 9 and 10, respectively. Each pump 7, 8, 9 and 10 is a trochoid pump which is effective for example for quietness. The pumps 7 and 8 are driven by a first motor 11, while the pumps 9 and 10 are driven by a second motor 12. Although any type of motor can be applicable as the first and second motors 11 and 12, it is preferable to employ a brushless motor which normally has a quick starting time.

The pumps 7, 8, 9 and 10 are provided with conduits H1, H2, H3 and H4 respectively. Each conduit H1, H2, H3 and H4 forms a modulating circuit for each pump and is arranged in parallel with each corresponding pump.

A first normally closed valve SWC1 and a first linear valve SLFR, serving as a pressure modulating means, are in series provided in the conduit H1 connected in parallel to the pump 7. The first normally closed valve SWC1 is positioned upstream of the pump 7 (an intake port side of the pump 7) and the linear valve SLFR is positioned downstream of the pump 7 (a discharge port side of the pump 7). Therefore, the first normally closed valve SWC1 controls the brake fluid return flow toward the master reservoir 3f via the conduit H1.

The conduit H2, which is connected in parallel to the pump 8, is mounted with a second linear valve SLRL, serving as the pressure modulating means.

A second normally closed valve SWC2 and a third linear valve SLFL, serving as the pressure modulating means, are in series provided in the conduit H3 connected in parallel to the pump 9. The second normally closed valve SWC2 is positioned upstream of the pump 9 (an intake port side of the pump 9) and the third linear valve SLFL is positioned downstream of the pump 9 (a discharge port side of the pump 9). Therefore, the second normally closed valve SWC2 controls the brake fluid return flow toward the master reservoir 3f via the conduit H3.

The conduit H4, which is connected in parallel to the pump 10, is mounted with a fourth linear valve SLRR, serving as the pressure modulating means.

The conduits G1, G2, G3 and G4 are provided with W/C pressure sensors (first, second, third and fourth pressure sensors) 13, 14, 15 and 16 between the pumps 7, 8, 9 and 10 and the W/Cs 6FR, 6RL, 6FL and 6RR, respectively. Each of the first, second, third and fourth pressure sensors serves as an actual braking force estimating means. Each W/C pressure sensor 13-16 detects W/C pressure of each wheel cylinder. Further, the M/C pressure sensors 17 and 18 are respectively located in the brake conduits E and F on the upstream sides (the M/C 3 sides) of the first and second normally open valves SNO1 and SNO2. The M/C pressure sensors 17 and 18 detect M/C pressure generated in the primary chamber 3a and the secondary chamber 3b of the M/C 3, respectively.

The W/C 6FR of the front wheel FR is supplied with a pressurized fluid discharged from the discharge port of the pump 7 to generate the brake pressure at the W/C 6 FR. A check valve 200 is mounted at the discharge port of the pump 7. The W/C 6FL of the front wheel FL is supplied with a pressurized fluid discharged from the discharge port of the pump 9 to generate the brake pressure at the W/C 6FR. A check valve 210 is mounted at the discharge port of the pump 9. The check valves 200 and 210 prevent the flow of brake fluid from the W/Cs 6FR and 6FL to the pumps 7 and 9, respectively. As described above, these components form the brake fluid pressure control actuator 5.

In the brake control apparatus for the vehicle as described above, a first conduit system is structured with a fluid pressure circuit (first auxiliary conduit), which connects the primary chamber 3a of the M/C 3 with the W/C 6FR via the conduits A and E, a fluid pressure circuit (main conduit), which connects the master reservoir 3f with the W/Cs 6FR and 6RL via the conduits C, G, G1 and G2, and fluid pressure circuits (first and second pressure modulating circuits) of the conduits H1 and H2 connected in parallel to the pumps 7 and 8.

A second conduit system is structured with a fluid pressure circuit (second auxiliary conduit), which connects the secondary chamber 3b of the M/C 3 with the W/C 6FL via the conduits B and F, a fluid pressure circuit (the main conduit), which connects the master reservoir 3f with the W/Cs 6FL and 6RR via the conduit C, the conduit G, and the conduits G3 and G4, and fluid pressure circuits (third and fourth pressure modulating circuits) of the conduits H3 and H4 connected in parallel to the pumps 9 and 10 respectively.

As illustrated in FIG. 2, the brake system ECU 100 is inputted with detection signals of the depression force sensor 2, the pressure sensors 13-18.

The brake ECU 100 is configured with a known microcomputer provided with a CPU, a memorizing portion 100a including a ROM and a RAM, an I/O and so on and executes various processes in accordance with programs stored in the ROM or the like. More specifically, the brake ECU 100 first calculates a physical value of depression force, which corresponds to a brake operating amount, based upon a detection signal of the depression force sensor 2. The brake ECU 100 then calculates a target braking force, which corresponds to the physical value of depression force, and, in order to generate an actual force corresponding to the calculated target braking force, the brake ECU 100 outputs a control signal for driving each control valve SCSS, SNO1, SNO2, SWC1, SWC2, SLFR, SLRL, SLFL and SLRR, and the first and second motors 11 and 12. The brake ECU 100 calculates W/C pressure on the basis of a detection signal of each pressure sensor 13, 14, 15 and 16 and feedbacks an actually generated braking force (actual braking force) to be approximately a target barking force.

The control signal for actuating the brake ECU 100, each control valve SCSS, SNO1, SNO2, SWC1, SWC2, SLFR, SLRL, SLFL and SLRR, and the first and second motors 11 and 12 is outputted by use of electric power mainly supplied by a battery 20 mounted to the vehicle as illustrated in FIG. 2. However, in an electric power supply stopped situation, because electric power is not supplied by the battery 20, the capacitor 21 functions as an auxiliary battery and supplies electric power to the abovementioned components.

The capacitor 21 is generally mounted on a vehicle that employs a brake-by-wire type brake control apparatus, and electric power of the battery is supplied and stored in the capacitor 21. The capacitor 21 is connected to the brake ECU 100 in the same manner as the battery 20 is. In this configuration, when electric potential generated at the battery 20 reaches zero, or reaches a predetermined value or below, instead of the battery 20, the capacitor 21 supplies electric power to the brake ECU 100. The electric power supplied to the brake ECU 100 by the capacitor 21 is further transmitted to each control valve SCSS, SNO1, SNO2, SWC1, SWC2, SLFR, SLRL, SLFL and SLRR; and the first and second motor 11 and 12.

The brake ECU 100 is embedded with switches (not illustrated) which are turned on or off to control electric current supplied to each control valve SCSS, SNO1, SNO2, SWC1, SWC2, SLFR, SLRL, SLFL and SLRR and each first and second motor 11 and 12.

The operations of the brake control apparatus in a normal brake operation, in an abnormal situation, and in an electric power supply stopped situation will be explained below separately. The abnormal situation differs from the electric power supply stopped situation. For example, the abnormal situation would occur due to a malfunction on one of control valves, not a power shortage on the battery, which causes the electric power supply stopped situation.

Table 1 shows the operating states of portions of the brake control apparatus in the normal brake operation, in the abnormal situation, and in the electric power supply stopped situation. The brake ECU 100 determines, by executing a conventional initial check or the like, whether the abnormal situation has occurred. Once the abnormal situation arises, an abnormal-state braking operation is executed until the abnormal situation is released.

TABLE 1

|  | Normal Brake operation | Abnormal Situation | Electric power supply stopped situation |
| --- | --- | --- | --- |
| SNO1 | ON (Disconnecting) | OFF (Connecting) | ON (Disconnecting) |
| SNO2 | ON (Disconnecting) | OFF (Connecting) | ON (Disconnecting) |
| SWC1 | ON (Connecting) | OFF (Disconnecting) | ON (Connecting) |
| SWC2 | ON (Connecting) | OFF (Disconnecting) | ON (Connecting) |
| SLFR | DUTY | OFF (Connecting) | DUTY |
| SLRL | DUTY | OFF (Connecting) | DUTY |

TABLE 1-continued

| | Normal Brake operation | Abnormal Situation | Electric power supply stopped situation |
|---|---|---|---|
| SLFL | DUTY | OFF (Connecting) | DUTY |
| SLRR | DUTY | OFF (Connecting) | DUTY |
| SCSS | ON (Connecting) | OFF (Disconnecting) | ON (Connecting) |
| 1st, 2nd Motors | ON | OFF | ON/OFF variable control |

(1) Operation During the Normal Brake Operation

During the normal braking operation, when the brake pedal 1 is depressed and the detection signal of the depression force sensor 2 is inputted to the brake ECU 100, the control valves SCSS, SNO1, SNO2, SWC1, SWC2, SLFR, SLRL, SLFL and SLRR, and the motors 11 and 12 are actuated respectively so as to achieve the state illustrated in Table 1.

Then, the first and second normally open valves SNO1 and SNO2 are turned on and the first and second normally closed valves SWC1 and SWC2 are also turned on. As a result, the first and second normally open valves SNO1 and SNO2 each turn to a disconnecting state (closed state), while the first and second normally closed valves SWC1 and SWC2 each turn to a connecting state (open state).

Turning on or off of each linear valve SLFR, SLRL, SLFL and SLRR is duty controlled, or PWM (Pulse Width Modulation) controlled under which the amount of electric power supplied per unit of time to each linear valve is adjusted, so that pressure differential between the upstream and downstream sides of each linear valve is controlled linearly. The stroke control valve SCSS is turned on and the stroke simulator 4 turns to a connecting state (open state), i.e., communicates with the secondary chamber 3b via the conduits B and D. Therefore, even if the pistons 3c and 3d move in response to the depression on the brake pedal 1, brake fluid in the secondary chamber 3b flows into the stroke simulator 4. As a result, a user or driver can feel a reaction force corresponding to the depression force applied to the brake pedal 1. Further, the user or driver can depress the brake pedal 1 without feeling like depressing a solid plate, which feeling may be created due to the M/C pressure at an extremely high pressure level.

Even further, each motor 11 and 12 is supplied with electric current, and each pump 7, 8, 9 and 10 suctions or discharges brake fluid. When each pump 7, 8, 9 and 10 operates in such a way, brake fluid is supplied to each W/C 6FR, 6RL, 6FL and 6RR.

Here, each first and second normally open valve SNO1 and SNO2 is in a disconnecting state, and brake fluid pressure at the downstream of each pump 7, 8, 9 and 10, i.e., W/C pressure in each W/C 6FR, 6RL, 6FL and 6RR is increased. Further, each first and second normally closed valve SWC1 and SWC2 is in a connecting state, and electric current per unit of time supplied to each linear valve SLFR, SLRL, SLFL and SLRR is duty controlled. Therefore, W/C pressure of each W/C 6FR, 6RL, 6FL and 6RR is modulated according to the duty ratio of the duty control.

The brake ECU 100 monitors the W/C pressure generated at each W/C 6FR, 6RL, 6FL and 6RR of each wheel, on the basis of a detection signal of each pressure sensor 13, 14, 15 and 16. The brake ECU 100 accordingly modulates each W/C pressure to a desired value by modulating an amount of electric current supplied to each motor 11 and 12 so as to control the number of rotations (rotation angle) thereof and by controlling the duty ratio for turning on or off of electric current supplied to each linear valve SLFR, SLRL, SLFL and SLRR.

As described above, braking force is generated so as to be a target braking force corresponding to a depressing force applied to the brake pedal 1.

(2) Abnormal-State Braking Operation

When an abnormal situation occurs in the vehicle brake control apparatus, there is a possibility that control signals cannot be outputted from the brake system ECU 100, or that some of the control valves SCSS, SNO1, SNO2, SWC1, SWC2, SLFR, SLRL, SLFL, SLRR or the first and second motors 11, 12 do not operate normally. In this case, electric power to the various control valves SCSS, SNO1, SNO2, SWC1, SWC2, SLFR, SLRL, SLFL, SLRR and the first and second motors 11, 12 are all turned off, as illustrated in Table 1.

In other words, since electric power supply to the first and second normally open valves. SNO1 and SNO2 is shut down, both valves SNO1 and SNO2 turn to connecting states (open states). Because electric power supply to the first and second normally closed valves SWC1 and SWC2 is shut down, both valves SWC1 and SWC2 turn to disconnecting states (closed states).

Since the electric power supply to all of the first to fourth linear valves SLFR, SLRL, SLFL, and SLRR is shut down, the first to fourth linear valves SLFR, SLRL, SLFL, and SLRR are in connecting states (open states). Since electric power supply to the stroke control valve SCSS is also supply, the stroke simulator 4 and the secondary chamber 3b are cut off from each other.

Further, electric power supply to the first and second motors 11 and 12 are shut down, and pumps 7, 8, 9 and 10 stop suction and discharge of the brake fluid.

In such circumstances, the primary chamber 3a of the M/C 3 communicates with the W/C 6FR of the front-right wheel FR via the conduits A, E and G1. The secondary chamber 3b of the M/C 3 communicates with the W/C 6FL of the front-left wheel FL via the conduits B, F and G3.

Therefore, when the brake pedal 1 is depressed and the push rod or the like is pushed according to the depression force applied to the brake pedal 1, M/C pressure is generated in the primary chamber 3a and the secondary chamber 3b. The M/C pressure is transmitted to the W/Cs 6FR and 6FL of the front wheels FL and FR. Braking force is generated thereby at both front wheels FR and FL.

According to the first embodiment of the present invention, as described above, the check valves 200 and 210 are installed at the pumps 7 and 9, respectively. Therefore, during operation in such abnormal situation, although W/C pressure in the W/Cs 6FR and 6FL for the front wheels is generated in the conduits G1 and G3, the check valves 200 and 210 enable to prevent the W/C pressure from being applied to the pumps 7 and 9 and further enable to prevent brake fluid from leaking at the pumps 7 and 9. Therefore, it is possible to prevent W/C pressure from decreasing.

(3) Operation in an Electric Power Supply Stopped Situation

An operation in an electric power supply stopped situation is executed when it is determined that the battery 20 stops supplying electric power, or the amount of electric power supplied by the battery 20 is insufficient. In this embodiment, the brake ECU 100 has been monitoring a voltage of the electric power from the battery 20 in order to determine whether or not the battery 20 stops supplying electric power, or the amount of electric power supplied by the battery 20 is insufficient. Because the process of this determination has been known, an explanation thereof will be skipped in the description.

The operation in the electric power supply stopped situation is basically similar to that in the normal braking operation, except for a way of conducting electric power to the first and second motors 11 and 12. In the brake-by-wire type brake control apparatus for a vehicle, because the first and second motors 11 and 12 consume the largest amount of electric power, in order to reduce the amount of electric power consumption, in the electric power supply stopped situation, electric power is supplied to the first and second motors 11 and 12 in a different manner used in the normal brake operation.

Specifically, as illustrated in Table 1, when the brake pedal 1 is depressed, the control valves SCSS, SNO1, SNO2, SWC1, SWC2, SLFR, SLRL, SLFL and SLRR are actuated in the same manner as in the normal brake operation, while the first and second motors 11 and 12 are driven as follows.

Figure 3A:
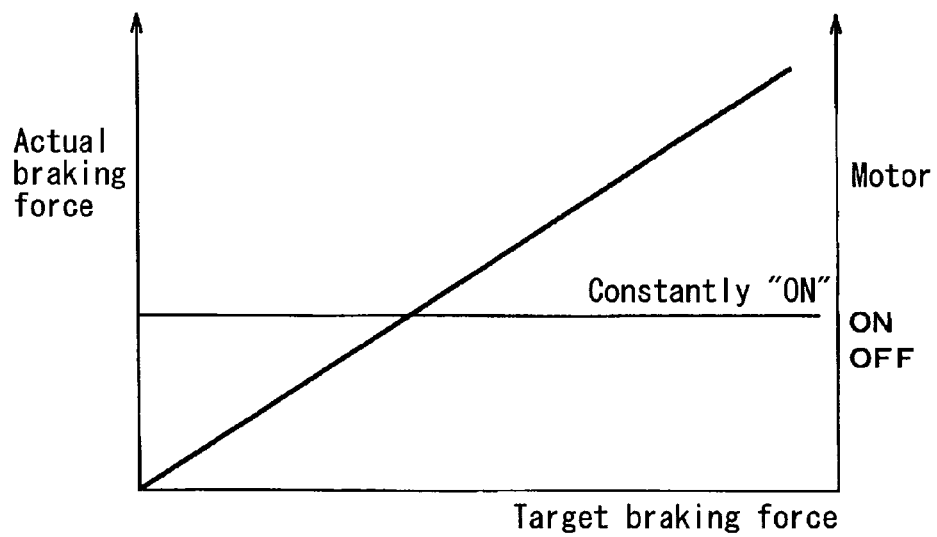
FIG. 3A illustrates a graph indicating, in a normal brake operation, a relation of a target braking force of actual braking force and actuations of the first and second motors.

FIG. 3A illustrates a graph indicating, in normal brake operation, a relation between; a target braking force calculated on the basis of depression force obtained by a detection signal from the depression force sensor 2 when the brake pedal 1 is depressed; and a timing when electric power to the first and second motors 11 and 12 is turned on or off. The graph further indicates an actual braking force when electric power to the first and second motors 11 and 12 is turned on as mentioned above.

Figure 3B:
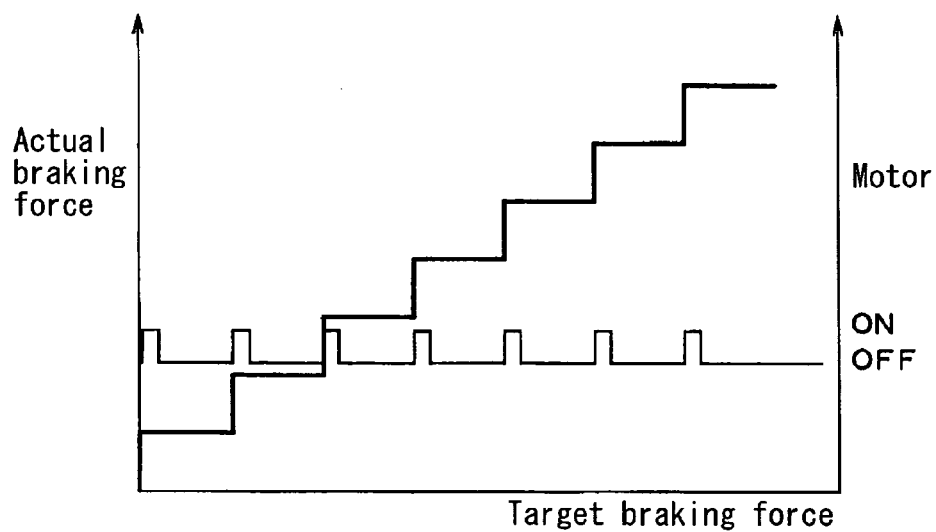
FIG. 3B illustrates a graph indicating, in an electric power supply stopped situation, a relation of a target braking force of actual braking force and actuations of the first and second motors.

FIG. 3B illustrates a graph indicating, in the electric power supply stopped situation, a relation between; a target braking force calculated on the basis of depression force obtained by a detection signal from the depression force sensor 2 when the brake pedal 1 is depressed; and a timing when electric power to the first and second motors 11 and 12 is turned on or off. The graph further indicates an actual braking force when electric power to the first and second motors 11 and 12 is turned on or off as mentioned above.

As illustrated in FIG. 3A, in normal brake operation, once the brake pedal 1 is depressed, because the brake ECU 100 calculates a target braking force on the basis of the detection signal detected by the depression force sensor 2, and the first and second motors 11 and 12 are constantly driven; an actual braking force is substantially identical to the target braking force.

On the other hand, as illustrated in FIG. 3B, in the electric power supply stopped situation, selected timings, at each of which the electric power is supplied to the motors, are set in advance, and at only those timings, the first and second motors 11 and 12 are driven.

Specifically, a memorized target braking force, at which electric power to the first and second motors 11 and 12 is turned on, is set and memorized in advance in the memorizing portion 100a, such as a ROM, in the brake ECU 100. When the target braking force reaches the memorized target braking force, electric power to the first and second motors 11 and 12 is turned on, otherwise electric power to the first and second motors 11 and 12 is turned off. More specifically, plural memorized target braking forces are memorized in advance in the brake ECU 100, and when the target braking force reaches one of the memorized target braking forces, driving the first and second motors 11 and 12 is started, and after that, driving first and the second motors 11 and 12 is stopped until the target braking force reaches another predetermined memorized target braking force, and such operations are continuously repeated.

In the electric power supply stopped situation, electric power to the first and second motors 11 and 12 is controlled in one condition where: (1) while a target braking force exists within a predetermined range, electric power from the capacitor 21 to the first and second motors 11 and 12 is turned on whereby driving the first and second motors 11 and 12 is started, and when a target braking force exists out of the predetermined range, the electric power to the first and second motors 11 and 12 is turned off whereby driving the first and second motors 11 and 12 is stopped; or (2) after a predetermined time has passed since the electric power to the first and second motors 11 and 12 is turned on, electric power to the first and second motors 11 and 12 is turned off; or (3) electric power to the first and second motors 11 and 12 is turned off when actual braking force obtained by the W/C pressure reaches a predetermined threshold.

Specifically, in the abovementioned condition (3), the predetermined threshold is set at a point where the W/C pressure reaches the actual braking force corresponding to the target braking force indicated in FIG. 3B, or at a point where the W/C pressure reaches a certain percentage of a predetermined increment of the actual braking force increased by the motor actuation.

Using the pressure sensors 13-16 as actual braking force estimating means for estimating an actual braking force, on the basis of detection signals from the pressure sensors 13-16, increments of the actual braking force are detected, and such increments are used for determining whether or not the condition (3) is fulfilled.

In this configuration, although actual braking force is not controlled to follow the target braking force linearly as in the normal brake operation, because actual braking force has changed so as to be in a stepped shape in the graph relative to target braking force, a total actuation time of the first and second motors 11 and 12 can be reduced, as a result, the amount of electric power to be consumed by the first and second motors 11 and 12 can be reduced. Further, because the amount of electric power to be consumed by the first and second motors 11 and 12 takes a large portion of an entire amount of electric power to be consumed by the brake control apparatus, the entire amount of electric power to be consumed by the brake control apparatus for a vehicle is also reduced by reducing the amount of electric power to be consumed by the first and second motors 11 and 12.

According to the embodiment of the brake control apparatus for a vehicle, in the electric power supply stopped situation, memorized target braking forces, at which the first and second motors 11 and 12 are driven, are set. At each memorized target braking forces, the first and second motors 11 and 12 are driven, otherwise they are not driven.

Specifically, in this configuration, although the target braking force changes depending on operation amount, because neutral zones, in which actual braking force does not change, are increased, a total of driving time of the first and second motors 11 and 12 is reduced. Thus, the amount of electric power to be consumed by the first and second motors 11 and 12 is reduced, as a result, an entire amount of electric power to be consumed by the brake control apparatus for a vehicle is reduced as much as possible.

Second Embodiment

A second embodiment of the present invention will be explained. In the second embodiment, the program stored in the memorizing portion 100a such as a ROM of the brake ECU 100 in the first embodiment is modified so that it changes the drivings of the first and second motors 11 and 12, the overall configuration of the second embodiment is basically the same as that in the first embodiment, so only the parts which are different from the first embodiment will be explained.

Figure 4A:
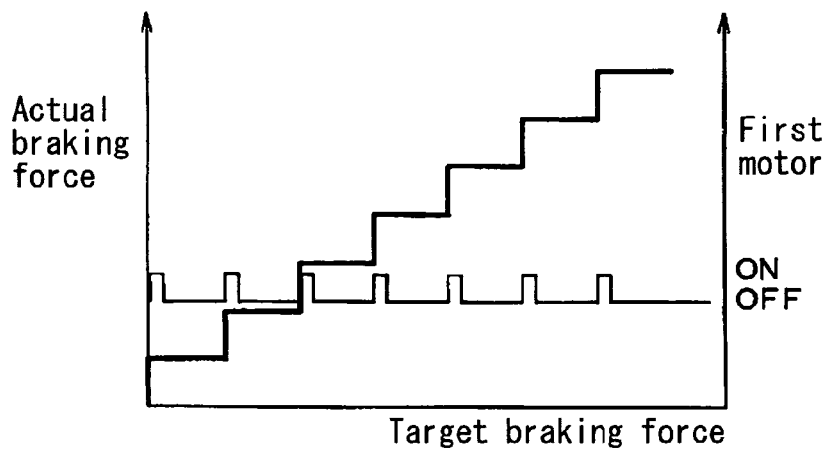
FIG. 4A illustrates a graph indicating, in an electric power supply stopped situation, a relation of a target braking force of actual braking force and actuations of the first motor.

FIG. 4A illustrates a relation between a target braking force and an electricity conducted to the first motor 11 (ON or OFF) in an electric power supply stopped situation. The graph further indicates an actual braking force when electric power to the first motor 11 is turned on or off as mentioned above.

Figure 4B:
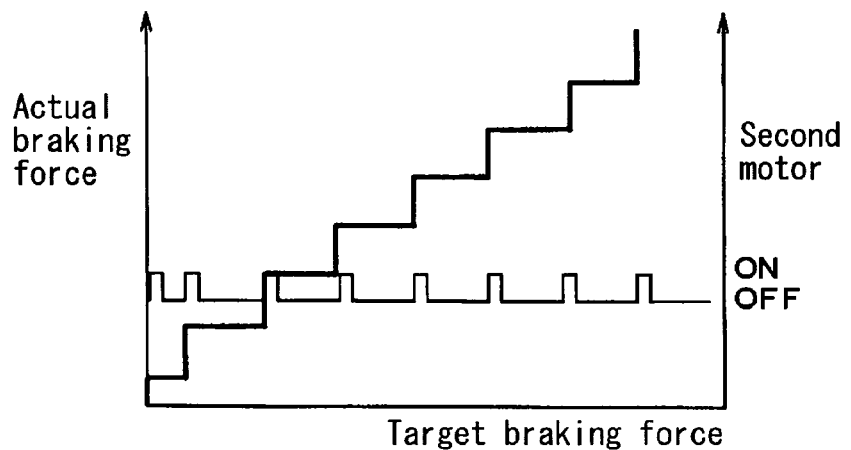
FIG. 4B illustrates a graph indicating, in an electric power supply stopped situation, a relation of a target braking force of actual braking force and actuations of the second motor.

FIG. 4B illustrates a relation between a target braking force and an electricity conducted to the second motor 12 (ON or OFF) in an electric power supply stopped situation. The graph further indicates an actual braking force when electric power to the second motor 12 is turned on or off as mentioned above.

Figure 4C:
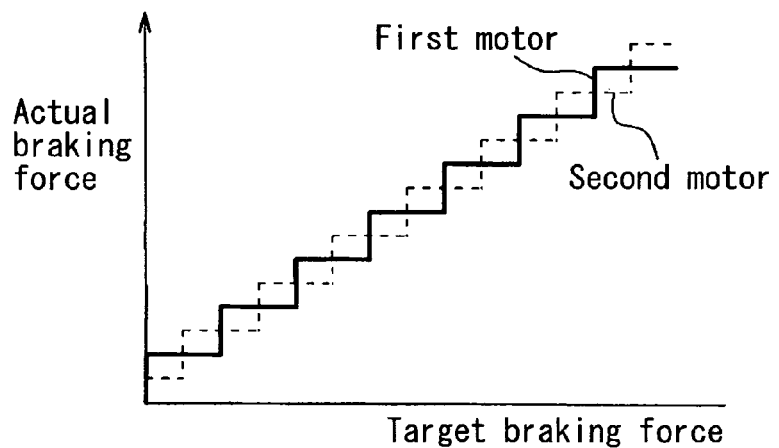
FIG. 4C illustrates a graph in which an actual braking force within a first conduit system generated when electric power is supplied to the first motor, is superposed on an actual braking force within the first conduit system generated when electric power is supplied to the second motor.

FIG. 4C illustrates an actual braking force at the first conduit system generated by the electricity conducted to the first motor 11 and actual braking force at the second conduit system generated by the electricity conducted to the second motor 12.

As illustrated in FIGS. 4A through 4C, by setting the memorized target braking forces at which the first motor 11 is driven so as not to be identical to the memorized target braking forces at which the second motor 12 is driven, the first motor 11 and the second motor 12 are driven alternately, as target braking force changes. In this configuration, by actuating the first motor 11 and the second motor 12 alternately, the actual braking force gradually increases.

The actual braking force in this embodiment practically indicates a W/C pressure. Specifically, actual braking force is increased in a manner where, once the first motor 11 is driven, a level of W/C pressure, which is generated at the first conduit system while the first motor 11 is driven, becomes higher than a level of W/C pressure which is generated at the second conduit system while the second motor 12 is driven, and then, once the second motor 12 is actuated, a level of W/C pressure, which is generated at the second conduit system while the second motor 12 is driven, becomes higher than a level of W/C pressure, which is generated at the first conduit system while the first motor 11 is actuated, and this is repeated as the first motor 11 and the second motor 12 are driven alternately.

In this configuration, although a total of actual braking force generated in the first conduit system and actual braking force generated in the second conduit system is the same as that in the first embodiment, change amount of the actual braking force, in other words, step changes in a characteristic line of the actual braking force, are reduced. Thus, in an electric power supply stopped situation, a brake feeling being similar to that in normal brake operation can be obtained.

In the second embodiment, although a total number of actuations on both motors is increased, because timings, at which the first motor 11 is actuated, differ from timings at which the second motor 12 is actuated, in other words, while the first motor 11 is actuated, the second motor 12 is not actuated, and when the second motor 12 is actuated, the first motor 11 is actuated, a total amount of electric power to be consumed is the same as that in the first embodiment.

Third Embodiment

A third embodiment of the present invention will be explained. In the third embodiment, in the electric power supply stopped situation, when an operation amount of the brake pedal 1 is reduced, target braking force varies in a different manner as in a normal brake operation. The configuration of the brake control apparatus for a vehicle is same as that in the first and second embodiments.

Figure 5:
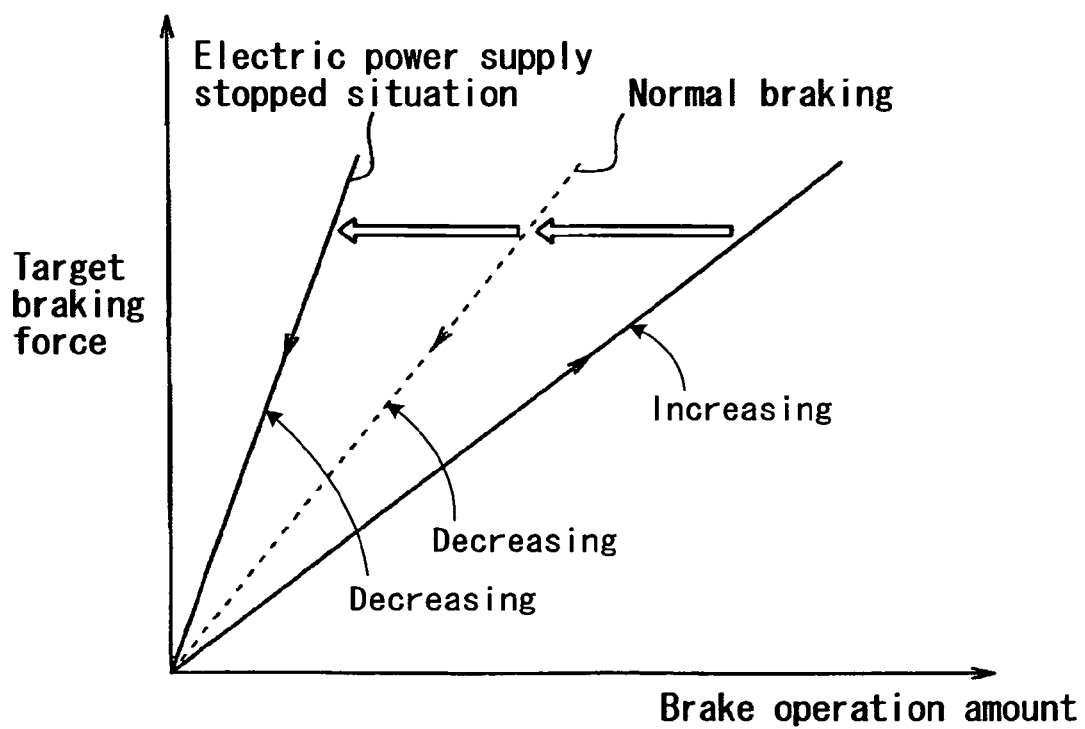
FIG. 5 illustrates a diagram indicating target braking force that varies relative to brake operation amount while the brake operation amount is increased, and target braking force that varies relative to brake operation amount while the brake operation amount is decreased.

FIG. 5 illustrates a graph indicating changes in target braking force relative to brake operation amounts at a time when an operation amount (brake operation amount) of the brake pedal 1 is increased and at a time when an operation amount of the brake pedal 1 is decreased.

Generally, according to a relation between brake operation amount and target braking force, because the relation, when the brake operation amount is increased, differs from the relation, when the brake operation amount is decreased; and this difference causes hysteresis therebetween. Because of the hysteresis, even when the brake operation amount is reduced, the braking force can be maintained at a certain level, and when the brake operation amount is increased again, target braking force is increased within the hysteresis, and after the brake operation amount has varied within the hysteresis, target braking force start increasing.

Thus, when brake operation amount being increased to a certain level of target braking force turns to be decreased, the target braking force is maintained at the certain level while brake operation amount is decreased within the hysteresis, and even while the brake operation amount varies within the hysteresis, actual braking force is maintained at the certain level of the target braking force without driving the first and second motors 11 and 12.

Further, the larger hysteresis is, the larger brake operation amount required for actuating the first and second motors 11 and 12 is. And thus, when brake operation amount, being increased to a certain level of target braking force, turns to be decreased, first and second motors 11 and 12 are not actuated suddenly.

Thus, in the third embodiment, as illustrated in FIG. 5, according to a characteristic of variations on target braking force relative to brake operation amount while brake operation amount is reduced, hysteresis in the electric power supply stopped situation is set to be larger than hysteresis in the normal brake operation.

Thus, when brake operation amount is reduced, the braking force is maintained without driving the first and second motors 11 and 12, in addition, when the brake operation amount being reduced turns to be increased, the first and second motors 11 and 12 are not actuated suddenly. Thus, comparing a characteristic of target braking force relative to brake operation amount in the normal brake operation to that in the electric power supply stopped situation, actuating time of the first and second motors 11 and 12 in the electric power supply stopped situation is smaller than that in the normal brake operation, and an amount of electric power to be consumed by the first and second motors 11 and 12 is reduced, as a result, a total amount of electric power to be consumed by the brake control apparatus for a vehicle is reduced as much as possible.

Other Embodiments

The brake control apparatus for a vehicle illustrated in FIG. 1 is disclosed as an example of a brake structure to which the present invention is applicable. The brake structure is not limited to the one in FIG. 1 and can be modified in various manners.

According to the first embodiment, the brake control apparatus has a cross (X) dual conduit system, one conduit system for the front-right wheel and the rear-left wheel and the other conduit system for the front-left wheel and the rear-right wheel. However, another conduit system, such as a front-rear conduit system, can be applicable.

In the above embodiments, the brake pedal 1 is used as an example of the brake operating member, however, the brake operation member may not be limited to the embodiments. For example, the brake operating member may be a brake lever or the like.

Thus, in the electric power supply stopped situation, memorized target braking forces, at which the controlling means starts driving the motor means, are set. At each memorized target braking forces, the controlling means starts driving the motor means and then the controlling means stops driving the first and second motors. Specifically, in this configuration, although the target braking force changes depending on operation amount, because neutral zones, in which actual braking force does not change, are increased, a total of driving time of the motor means is reduced. Thus, the amount of electric power to be consumed by the motor means is reduced, as a result, an entire amount of electric power to be consumed by the brake control apparatus for a vehicle is reduced as much as possible.

For example, according to another aspect of the present invention, the memorizing portion is memorized with a range of target braking force within which the motor means is driven in the electric power supply stopped situation, and in the electric power supply stopped situation, while the operation amount detected by the operation amount sensor increases, the controlling means starts driving the motor means when the target braking force corresponding to the operation amount exists within the range of target braking force, and the controlling means stops driving the first and second motors when the target braking force corresponding to the operation amount exists out of the range of target braking force.

Further, according to further aspect of the present invention, the brake control apparatus for a vehicle further comprises an actual braking force estimating means estimating an actual braking force generated in accordance with the target braking force, and wherein, in the electric power supply stopped situation, on the basis of the actual braking force estimated by the actual braking force estimating means, the controlling means stops driving the motor means once the actual braking force exceeds a threshold while an increment of the actual braking force during the motor means is driven.

Furthermore, according to still another aspect of the present invention, the controlling means stops driving the motor means after starting driving the motor means for a predetermined time period.

In those cases, according to still further aspect of the present invention, the memorizing portion is memorized with plural memorized target braking forces at each of which the controlling means starts the driving the motor means, and in the electric power supply stopped situation, while the operation amount detected by the operation amount sensor increases, the controlling means starts driving the motor means when the target braking force corresponding to the operation amount reaches one of the memorized target braking forces memorized in the memorizing portion and then stops driving the motor means, and these operations are continuously repeated.

According to an aspect of the present invention, while the operation amount detected by the operation amount sensor decreases, in the electric power supply stopped situation, the controlling means sets the target braking force corresponding to the operation amount at a value higher than that in an normal brake operation, in which the battery supplies electric power to the motor.

Thus, when brake operation amount is reduced, the braking force is maintained without driving the motor means, in addition, when the brake operation amount being reduced turns to be increased, the motor means are not actuated suddenly. Thus, comparing a characteristic of target braking force relative to brake operation amount in the normal brake operation to that in the electric power supply stopped situation, actuating time of the motor means in the electric power supply stopped situation is smaller than that in the normal brake operation, and an amount of electric power to be consumed by the motor means is reduced, as a result, a total amount of electric power to be consumed by the brake control apparatus for a vehicle is reduced as much as possible.

According to much further aspect of the present invention, the pump means includes a first pump located in a first one of the four conduits, the first pump for pressurizing the first front wheel cylinder by drawing in and discharging the brake fluid stored in the reservoir, a second pump located in a second one of the four conduits, the second pump for pressurizing the first rear wheel cylinder by drawing in and discharging the brake fluid stored in the reservoir, a third pump located in a third one of the four conduits, the third pump for pressuring the second front wheel cylinder by drawing in and discharging the brake fluid stored in the reservoir, and a fourth pump located in a fourth one of the four conduits, the fourth pump for pressuring the second rear wheel cylinder by drawing in and discharging the brake fluid stored in the reservoir; the brake control apparatus further comprises a first conduit system arranged in the main conduit and including the first pump and the second pump for supplying the pressurized brake fluid to the first front wheel cylinder and the first rear wheel cylinder, respectively, and a second conduit system arranged in the main conduit and including the third pump and the fourth pump for supplying the pressurized brake fluid to the second front wheel cylinder and the second rear wheel cylinder, respectively; wherein, the motor means includes a first motor driving the first and second pumps provided at the first conduit system and a second motor driving the third and fourth pumps provided at the second conduit system, and wherein, the memorizing portion is memorized with a memorized target braking force for driving the first motor and a memorized target braking force for driving the second motor, the memorized target braking force for the first motor being different from the memorized target braking force for the second motor.

In this configuration, although a total of actual braking force generated in the first conduit system and actual braking force generated in the second conduit system is the same as that in the first embodiment, change amount of the actual braking force, in other words, step changes in a characteristic line of the actual braking force, are reduced. Thus, in an electric power supply stopped situation, a brake feeling being similar to that in normal brake operation can be obtained.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A brake control apparatus for a vehicle, comprising:
a brake operating member operated by a driver;
an operation amount sensor for detecting an operation amount of the brake operating member;
first and second front wheel cylinders mounted at first and second front wheels respectively;
first and second rear wheel cylinders mounted at first and second rear wheels respectively;
a reservoir for storing brake fluid;
a main conduit connecting the first and second front wheel cylinders and the first and second rear wheel cylinders with the reservoir, the main conduit branching into four conduits respectively connected with the first and second front wheel cylinders and the first and second rear wheel cylinders;
pump means for pressurizing the first and second front wheel cylinders and the first and second rear wheel cylinders via the main conduit by drawing in and discharging the brake fluid stored in the reservoir;
motor means for driving the pump means;
pressure modulating means modulating a wheel cylinder pressure generated within each of the first and second front wheel cylinders and the first and second rear wheel cylinders respectively by means of an actuation of the pump means;
controlling means actuating the pressure modulating means and the motor means based upon a detection signal of the operation amount sensor;
a battery supplying electric power in order to actuate the controlling means, the pressure modulating means and the motor means;
a capacitor supplying electric power when the battery stops supplying electric power; and
the controlling means configured to:
calculate a target braking force corresponding to the operation amount detected by the operation amount sensor, when an operation of the brake operating member is detected based upon the detection signal of the operation amount sensor;
drive the motor means and the pressure modulating means on the basis of the electric power supplied by one of the battery and the capacitor, so that a braking force corresponding to the target braking force is generated;
the controlling means including a memorizing portion memorizing a memorized target braking force at which the driving of the motor means is to be started; and,
the controlling means configured to drive the motor means on the basis of the electric power supplied by the capacitor, only when the target braking force corresponding to the operation amount reaches the memorized target braking force at which the driving of the motor means is to be started in an electric power supply stopped situation, in which electric power is not supplied by the battery or the amount of electric power supplied by the battery is insufficient, while the operation amount detected by the operation amount sensor increases.

2. The brake control apparatus for a vehicle according to claim 1, wherein the memorizing portion is memorized with a range of target braking force within which the motor means is driven in the electric power supply stopped situation, and in the electric power supply stopped situation, while the operation amount detected by the operation amount sensor increases, the controlling means starts driving the motor means when the target braking force corresponding to the operation amount exists within the range of target braking force, and the controlling means stops driving the motor means when the target braking force corresponding to the operation amount exists out of the range of target braking force.

3. The brake control apparatus for a vehicle according to claim 1 further comprising an actual braking force estimating means estimating an actual braking force generated in accordance with the target braking force, and wherein, in the electric power supply stopped situation, on the basis of the actual braking force estimated by the actual braking force estimating means, the controlling means stops driving the motor means once the actual braking force exceeds a threshold.

4. The brake control apparatus for a vehicle according to claim 1, wherein the controlling means stops driving the motor means after driving the motor means for a predetermined time period.

5. The brake control apparatus for a vehicle according to claim 1, wherein the memorizing portion is memorized with plural memorized target braking forces at each of which the controlling means starts driving the motor means, and in the electric power supply stopped situation, while the operation amount detected by the operation amount sensor increases, the controlling means starts driving the motor means when the target braking force corresponding to the operation amount reaches one of the memorized target braking forces memorized in the memorizing portion and then stops driving the motor means, and these operations are continuously repeated.

6. The brake control apparatus for a vehicle according to claim 1, wherein, while the operation amount detected by the operation amount sensor decreases, in the electric power supply stopped situation, the controlling means sets the target braking force corresponding to the operation amount at a value larger than that in a normal brake operation, in which the battery supplies electric power to the motor means.

7. The brake control apparatus for a vehicle according to claim 1 wherein,
the pump means includes a first pump located in a first one of the four conduits, the first pump for pressurizing the first front wheel cylinder by drawing in and discharging the brake fluid stored in the reservoir, a second pump located in a second one of the four conduits, the second pump for pressurizing the first rear wheel cylinder by drawing in and discharging the brake fluid stored in the reservoir, a third pump located in a third one of the four conduits, the third pump for pressurizing the second front wheel cylinder by drawing in and discharging the brake fluid stored in the reservoir, and a fourth pump located in a fourth one of the four conduits, the fourth pump for pressurizing the second rear wheel cylinder by drawing in and discharging the brake fluid stored in the reservoir;
the brake control apparatus further comprises a first conduit system arranged in the main conduit and including the first pump and the second pump for supplying the pressurized brake fluid to the first front wheel cylinder and the first rear wheel cylinder, respectively, and a second conduit system arranged in the main conduit and including the third pump and the fourth pump for supplying the pressurized brake fluid to the second front wheel cylinder and the second rear wheel cylinder, respectively;
wherein, the motor means includes a first motor driving the first and second pumps provided at the first conduit system and a second motor driving the third and fourth pumps provided at the second conduit system, and wherein, the memorizing portion is memorized with a memorized target braking force for driving the first motor and a memorized target braking force for driving the second motor, the memorized target braking force for the first motor being different from the memorized target braking force for the second motor.

* * * * *